J. WILEY.
Car Starter.

No. 71,102.  Patented Nov. 19, 1867.

Witnesses:
Theo Inscke
Alfred R. Egerton

Inventor:
John Wiley
Per Munn
Attorneys

United States Patent Office.

JOHN WILEY, 2D, OF SOUTH READING, MASSACHUSETTS.

Letters Patent No. 71,102, dated November 19, 1867.

---

IMPROVED CAR-BRAKE AND STARTER.

---

*The Schedule referred to in these Letters Patent and making part of the same.*

---

TO ALL WHOM IT MAY CONCERN:

Be it known that I, JOHN WILEY, 2d of South Reading, in the county of Middlesex, and State of Massachusetts, have invented a new and useful Improvement in Car-Starter and Brake; and I do hereby declare that the following is a full, clear, and exact description thereof, which will enable others skilled in the art to make and use the same, reference being had to the accompanying drawings, forming part of this specification, in which—

Figure 1:
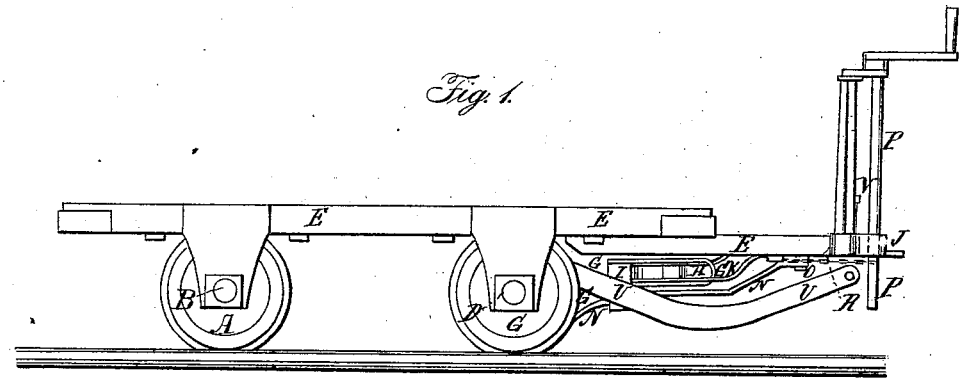
Figure 2:
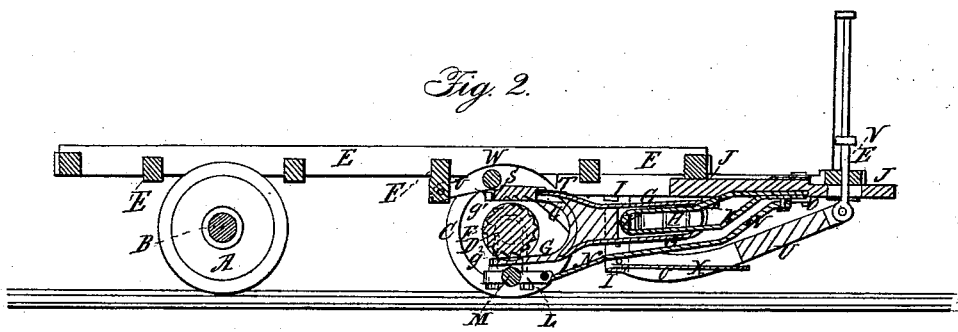
Figure 3:
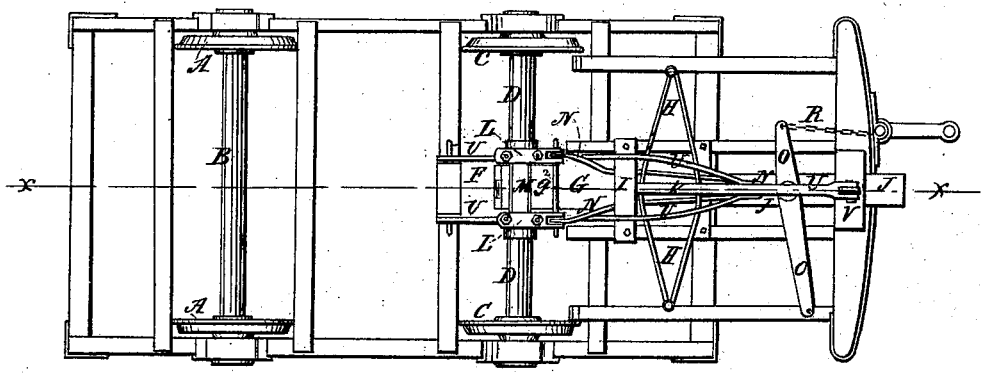

Figure 1 is a side view of the running part of a car, to which my improved apparatus has been attached.
Figure 2 is a vertical longitudinal section of the same, taken through the line $x$ $x$, fig. 3.
Figure 3 is an under side view of the same.
Similar letters of reference indicate like parts.

My invention has for its object to improve the construction of my improved car-starter and brake patented March 12, 1867, and numbered 62,911; and it consists in forming teeth upon the central part of the friction-wheel; in the combination of the pivoted toothed bar with the slotted upper arm of the brake-bar, and with the toothed friction-wheel; in the combination of the horizontal lever, connecting-rods, yokes, and roller, with each other, with the lower arm of the brake-bar, with the axle and frame of the car, and with the crank-shaft; in the combination of the treadle-pin, treadle-lever, roller, and spring, with each other, and with the frame of the car; and in the combination of the draught-bar, connecting-strap, spring, and brake-bar, with each other, and with the frame of the car; the whole being constructed and arranged as hereinafter more fully described.

A are the rear wheels, B is the rear axle, C are the fore wheels, D is the fore axle, and E is the frame of the car. F is a friction-wheel, formed upon or attached to the middle of the forward axle D, the central part of which has ratchet-teeth formed in it, as shown in figs. 2 and 3. G is the brake-bar, the forward end of which is slotted for the reception of the spring H, and the rear end of which is forked, one arm, $g^1$, passing above, and the other, $g^2$, passing below, the forward axle D, as shown in fig. 2. The brake-bar G is held in its place by the strap I, the ends of which are secured to the frame E of the car. J is the draught-bar, which works back and forth in keepers attached to the frame E of the car, and which has a shoulder formed upon its upper side, so that when the draught is too strong for the spring H, it may come directly upon the frame of the car. K is a strap, which passes around the spring H, and the ends of which are secured to the draught-bar J, so that for all ordinary loads the draught may come upon the spring H. L are yokes, the bows of which pass around and ride upon the axle D, upon each side of the friction-wheel F, and between the bars of which is pivoted a roller, M. N are connecting-rods, the rear ends of which are attached to the yokes L, and the forward ends of which are pivoted to the lever O. One end of the lever O is pivoted to the frame E of the car, and the other end is connected to the crank-shaft P by the chain R, or its equivalent, so that by turning the shaft P to wind up the chain R, the yokes L will be drawn forward, forcing the roller M against the lower arm $g^2$ of the brake-bar G, forcing the said arm against the friction-wheel F, and thus checking the motion of the car. The upper arm $g^1$ of the brake-bar G is slotted for the reception of the toothed bar S, one end of which is pivoted to said bar G, and the other end is held up by the spring T, as shown in fig. 2. U is a bent and forked lever, to the forward end of which is pivoted the lower end of the treadle-pin V, which passes up through the frame of the car in such a position as to be conveniently reached and operated by the driver with his foot. The rear part of the lever U is branched, and passes back upon each side of the brake-bar G, and is bent or curved so as to pass over the axle D, and its rear end is pivoted to the frame E of the car, in the rear of the said forward axle. W is a friction-roller, pivoted between branches of the lever U in such a position that when the forward end of the lever is forced downward, the said roller is pressed against the toothed bar S, forcing it downward so that its teeth may take hold of the teeth of the friction-wheel F at the same time that the arm $g^1$ of the brake-bar G is forced down upon the said friction-wheel F, so that the first effect of the draught will be applied to revolve the axle D and start the car. The forward end of the lever U is raised, lifting the roller W away from the arm $g^1$ of the brake-bar G by the spring X, the rear end of which is secured to the strap I, and its forward end presses up against the forward part of the said lever U, holding it up until forced down by operating the treadle-pin V.

What I claim as new, and desire to secure by Letters Patent, is—

1. The combination and arrangement of the toothed bar S, arms $g^1$ $g^2$ of the brake-bar G, toothed friction-wheel F, lever O, connecting-rods N, yokes L, roller M, frame E, axle D, and shaft I, substantially as described for the purpose specified.

2. The combination and arrangement of the treadle-pin V, treadle-lever U, spring X, roller W, arms $g^1$ of brake-bar G, toothed bar S, and frame E, substantially as described for the purpose specified.

3. The combination of the draught-bar J, connecting-strap K, spring H, brake-bar and ratchets G, with each other, and with the frame E of the car, substantially as herein shown and described and for the purpose set forth.

JOHN WILEY, 2D.

Witnesses:
SUMNER PRATT,
G. H. PUTNEY.